US011839921B2

(12) United States Patent
Wang

(10) Patent No.: US 11,839,921 B2
(45) Date of Patent: Dec. 12, 2023

(54) SPIRAL STEP TWIST DRILL BIT

(71) Applicant: Danyang Kaiyiyuan Tools Co., Ltd., Zhenjiang (CN)

(72) Inventor: Kaibin Wang, Zhenjiang (CN)

(73) Assignee: Danyang Kaiyiyuan Tools Co., Ltd., Zhenjiang (CN)

(*) Notice: Subject to any disclaimer, the term of this patent is extended or adjusted under 35 U.S.C. 154(b) by 0 days.

(21) Appl. No.: 17/837,215

(22) Filed: Jun. 10, 2022

(65) Prior Publication Data

US 2022/0362863 A1   Nov. 17, 2022

(30) Foreign Application Priority Data

Jun. 11, 2021  (CN) .......................... 202121312367.9

(51) Int. Cl.
  B23B 51/02  (2006.01)
  B23B 51/00  (2006.01)

(52) U.S. Cl.
  CPC ............ B23B 51/02 (2013.01); B23B 51/009 (2013.01); *B23B 2251/046* (2013.01)

(58) Field of Classification Search
  CPC .......... B23B 2251/046; B23B 2251/08; B23B 2251/406; B23B 51/009; B23B 51/02
  See application file for complete search history.

(56) References Cited

U.S. PATENT DOCUMENTS

| | | | |
|---|---|---|---|
| 2008/0166195 A1* | 7/2008 | Gentry .................. | B23B 51/009 408/224 |
| 2014/0363249 A1* | 12/2014 | Oka ........................ | B23B 51/02 408/224 |
| 2019/0022768 A1* | 1/2019 | Lokkinen .............. | B23B 51/009 |
| 2020/0094331 A1* | 3/2020 | Wang ...................... | B23B 51/02 |

FOREIGN PATENT DOCUMENTS

| | | | | |
|---|---|---|---|---|
| CN | 205551557 U | | 9/2016 | |
| CN | 110802259 A | | 2/2020 | |
| GB | 155004 A | * | 12/1920 | ........... B23B 51/009 |
| WO | 2017136966 A1 | | 8/2017 | |

* cited by examiner

*Primary Examiner* — Alan Snyder

(57) ABSTRACT

A spiral step twist drill bit, including a shank and a cutting portion. The cutting portion is provided with a spiral flute and a body clearance. A tip of the cutting portion is provided with a chisel edge and a cutting edge. A flank face is connected to the cutting edge, and is provided with a spiral cutting groove. A spiral direction of the spiral cutting groove is the same as that of the spiral flute. A slope of the spiral cutting groove is the same as that of the flank face. The spiral cutting groove is configured to divide the cutting edge into multiple segments to form multiple first edges and second edges.

5 Claims, 2 Drawing Sheets

SPIRAL STEP TWIST DRILL BIT

CROSS-REFERENCE TO RELATED APPLICATIONS

This application claims the benefit of priority from Chinese Patent Application No. 202121312367.9, filed on Jun. 11, 2021. The content of the aforementioned application, including any intervening amendments thereto, is incorporated herein by reference in its entirety.

TECHNICAL FIELD

This application relates to cutting tools, and more particularity to a spiral step twist drill bit.

BACKGROUND

A twist drill is a tool that drills a round hole in a workpiece by rotational cutting with respect to a fixed axis, and named for its spiral chip flute resembling twist. Currently, there are 2, 3 or more flutes on the twist drill bit, where the 2-flute twist drill bit is dominant. The twist drill bit can be clamped on a manual or electric hand-held drilling tool or on a drilling machine, milling machine, lathe or even a machining center for use.

The conventional twist drill relies on two symmetrically-distributed straight cutting edges to simultaneously complete a corresponding metal cutting amount during drilling, requiring a relatively larger power. Moreover, the edges are prone to damage due to a large reaction force. At present, there is a step twist drill bit on the market, which, by means of the stepped cutting, not only enables easy positioning during the layered drilling, but also reduces the cutting resistance and heat generation, improves drilling efficiency, extends the service life, greatly enhancing the drilling performance. Moreover, the step twist drill bit also enables the precise drilling of round holes, and reduces the generation of the burrs. Therefore, the step twist drill bit has attracted a lot of attention in the field of mechanical machining.

Nevertheless, steps of the existing step twist drill bit are distributed spaced apart in parallel along an axial direction of the drill bit, and the step surface is perpendicular to the drill bit axis, resulting in overlapped processing and attenuation of cutting efficiency. Furthermore, the cutting chips will be held at the step surfaces, affecting the subsequent processing.

SUMMARY

An object of the present disclosure is to provide a spiral step twist drill bit to improve drilling precision and cutting performance.

Technical solutions of this application are described as follows.

This application provides a spiral step twist drill bit, comprising:
a shank; and
a cutting portion;
wherein the cutting portion is provided with a spiral flute and a body clearance; a tip of the cutting portion is provided with a chisel edge and a cutting edge; a flank face connected to the cutting edge is provided with a spiral cutting groove; a spiral direction of the spiral cutting groove is the same as a spiral direction of the spiral flute; a slope of the spiral cutting groove is the same as a slope of the flank face; the spiral cutting groove is configured to divide the cutting edge into a plurality of segments to form a plurality of first edges and a plurality of second edges; the spiral cutting groove is configured to divide the flank face into a plurality of first annular surfaces and a plurality of second annular surfaces, wherein the plurality of first annular surfaces are perpendicular to the plurality of second annular surfaces; the plurality of first edges are respectively located on the plurality of first annular surfaces; and the plurality of second edges are respectively located on the plurality of second annular surfaces.

In some embodiments, the spiral cutting groove has a varying pitch.

In some embodiments, a pitch of the spiral cutting groove increases from the tip of the cutting portion towards the shank In some embodiments, an increment rate of the pitch of the spiral cutting groove is 1.2-1.5.

In some embodiments, a spiral transition step is provided at an end of each of the plurality of first annular surfaces away from a corresponding second annular surface; and a spiral direction of the spiral transition step is the same as that of the spiral flute.

In some embodiments, a spiral chip removal groove is provided at a connection between each of the plurality of first annular surfaces and a corresponding second annular surfaces; and a spiral direction of the spiral chip removal groove is the same as the spiral direction of the spiral flute.

Compared to conventional step drill bits, the spiral step twist drill bit provided herein reduces a machining overlap, which greatly increases the cutting speed, and the spiral cutting groove is more conducive to the chip discharge.

Figure 1:
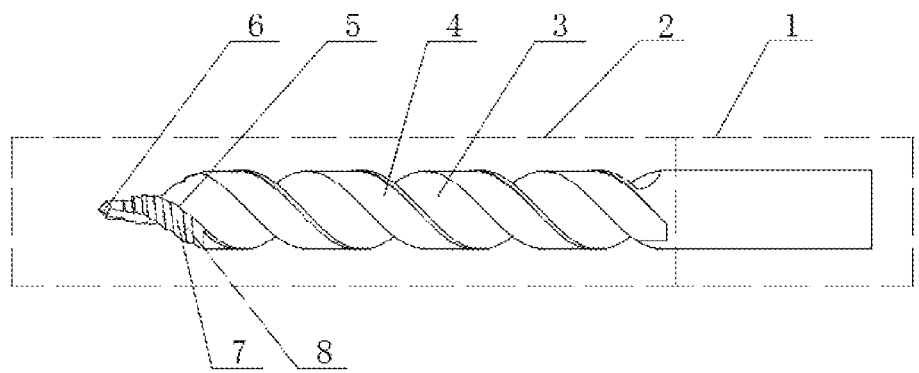
FIG. 1 schematically depicts a structure of a spiral step twist drill bit according to an embodiment of the present disclosure.

In the drawings, 1, shank; 2, cutting portion; 3, spiral flute; 4, body clearance; 5, cutting edge; 6, chisel edge; 7, flank face; 8, spiral cutting groove; 9, first edge; 10, second edge; 11, first annular surface; 12, second annular surface; 13, spiral transition step; and 14, spiral chip removal groove.

DETAILED DESCRIPTION OF EMBODIMENTS

Technical solutions of the present disclosure will be clearly and completely described below with reference to the embodiments and accompanying drawings.

As shown in FIGS. 1-4, a spiral step twist drill bit includes a shank 1 and a cutting portion 2. The cutting portion 2 is provided with a spiral flute 3 and a body clearance 4. A tip of the cutting portion 2 is provided with a chisel edge 6 and a cutting edge 5. A flank face 7 connected to the cutting edge 5 is provided with a spiral cutting groove 8. A spiral direction of the spiral cutting groove 8 is the same as a spiral direction of the spiral flute 3. A slope of the spiral cutting groove 8 is the same as a slope of the flank face 7. The spiral cutting groove 8 is configured to divide the cutting edge 5 into multiple segments to form multiple first edges 9 and second edges 10. The spiral cutting groove 8 is configured to divide the flank face 7 into a plurality of first annular surfaces 11 and a plurality of second annular surfaces 12, where the first annular surfaces 11 are perpendicular to the second annular surfaces 12. The first edges 9 are respectively located on the first annular surfaces 11. The second edges 10 are respectively located on the second annular surfaces 12.

Figure 2:
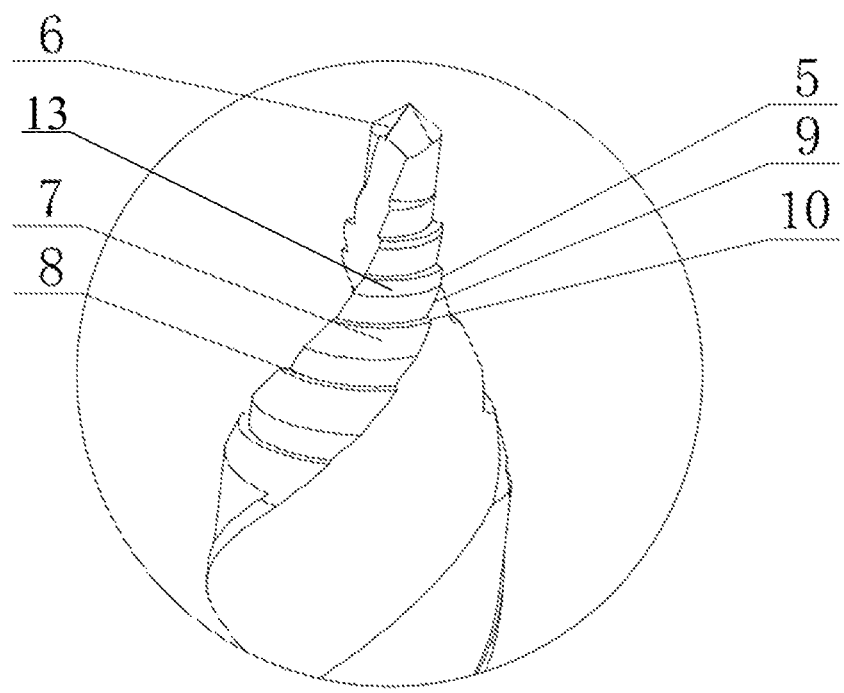
FIG. 2 schematically depicts a tip of a cutting portion of the spiral step twist drill bit according to an embodiment of the present disclosure.

Specifically, referring to FIG. 2, the first edges 9 and the second edges 10 has a spiral step structure. The spiral direction of the spiral cutting groove 8 is the same as a rotating direction of the spiral step twist drill bit. Therefore, during drilling round holes in a workpiece, the workpiece is subjected to a greater centrifugal force, which is energy-efficient for the spiral step twist drill bit. In addition, compared to the existing parallel step structure, the spiral step structure defines a high point and a low point at the same step, such that there is a height difference between two adjacent steps within the same pitch. Therefore, multiple steps of the spiral steps structure can realize segmental cutting, which is more labor-saving and has faster cutting speed. After a first step has performed cutting, the spiral step structure continues to cut inward with a small force, greatly increasing a cutting speed and reducing a force, such that cut longer distances can be cut with the same force.

In an embodiment, the first edges 9 and the second edges 10 enable a segmented cutting for the workpiece.

In an embodiment, since a diameter of the cutting edge 5 is gradually increased from the tip of the cutting portion 2 to the shank 1, after the spiral cutting groove 8 divides the cutting edge 5 into multiple segments to form new multiple first edges 9 and second edges 10, a diameter of the first edges 9 and that of the second edges 10 are increased from the tip of the cutting portion 2 to the shank 1.

In an embodiment, the spiral cutting groove 8 has a varying pitch, that is, the pitch of the spiral cutting groove 8 is variable from the tip of the cutting portion 2 towards the shank 1.

In an embodiment, a pitch of the spiral cutting groove 8 increases from the tip of the cutting portion 2 towards the shank 1. An increment rate of the pitch is 1.2-1.5. Within the increment rate, a triangular edge, which is formed after cutting by a first edge 9 and a second edge 10, can be cut entirely by a next adjacent first edge 9 and a next adjacent second edge 10 during a next cutting.

The pitch of the spiral cutting groove 8 increases from the tip of the cutting portion 2 towards the shank 1, resulting that a step length of the spiral step structure formed by a first edge 9 and a second edge 10 increases from the tip of the cutting portion 2 towards the shank 1, that is, a length of the first edge 9 increases from the tip of the cutting portion 2 towards the shank 1. Specifically, a length of a first edge 9 firstly contacting the workpiece is shorter. In consequence, during drilling round holes in the workpiece, the first edge 9 firstly contacting the workpiece and a second edge 10 firstly contacting the workpiece both have a smaller contact area with the workpiece, and are subject to less resistance, thereby making a faster and smoother drilling.

In addition, since the pitch of the spiral cutting groove 8 increases, the step length of the spiral step structure increases, that is, the length of the first edge 9 increases. During drilling round holes in the workpiece, a first edge 9 having a greater length and a corresponding second edge 10 spend more time in a position closer to the largest hole diameter of a product (i.e., a position closer to a hole diameter of a finished size), so as to better grind the hole wall to allow better smoothness and roundness.

In an embodiment, referring to FIG. 2, a spiral transition step 13 is provided at an end of each of the first annular surfaces 11 away from a corresponding second annular surface 12. A spiral direction of the spiral transition step 13 is the same as that of the spiral flute 3. In this embodiment, the spiral transition step 13 is provided at the end of each of the first annular surface 11 away from the corresponding second annular surface 12, i.e., the spiral transition step 13 is located at an end of each of the first annular surface 11 which is connected to a last second annular surface 12, such that a spiral transition step 13 is provided between each of two adjacent spiral step structures for transition. The spiral transition step 13 plays a cushioning role when the spiral step structure becomes larger. During use, the spiral transition step 13 reduces a stop feeling and sudden drop feeling which occurs when the spiral step structure performs segmented cutting.

In an embodiment, a size of the spiral transition step 13 increases from the tip of the cutting portion 2 towards the shank 1, making a smoother transition between the first annular surface 11 and the last second annular surface 12. Thereby, a drilling is smoother, which improves a cutting speed.

Figure 3:
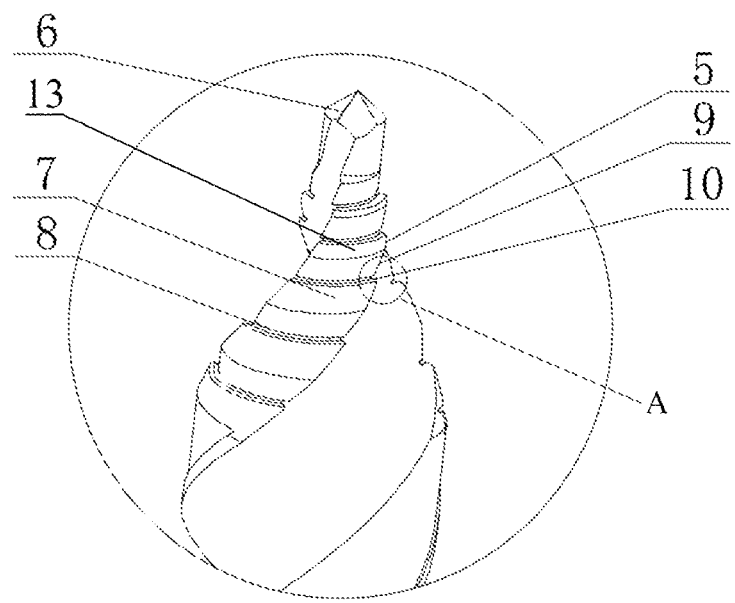
FIG. 3 schematically depicts a tip of a cutting portion of a spiral step twist drill bit with a spiral chip removal groove according to an embodiment of the present disclosure.
Figure 4:
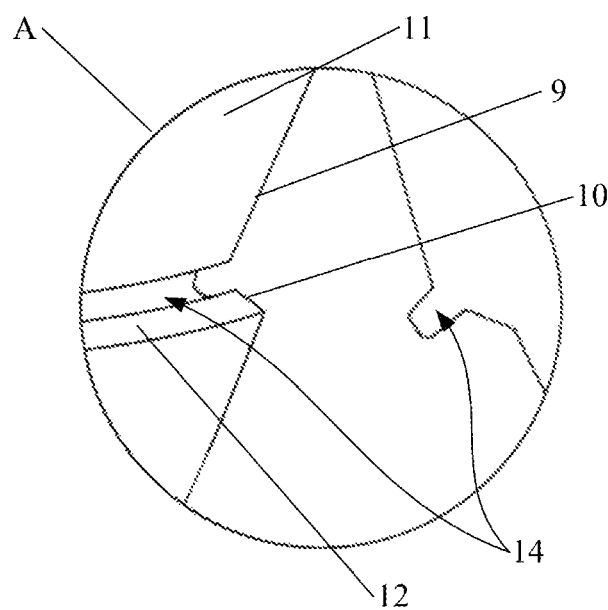
FIG. 4 is an enlarged view of part A in FIG. 3.

In an embodiment, referring to FIGS. 3-4, a spiral chip removal groove 14 is provided at a connection between each of the first annular surfaces 11 and a corresponding second annular surface 12. A spiral direction of the spiral chip removal groove 14 is the same as the spiral direction of the spiral flute 3. Specifically, as shown in FIGS. 3-4, the spiral chip removal groove 14 is located at a right-angle recess formed by each of the first annular surface 11 and a corresponding second annular surface 12, and no spiral chip removal groove 14 is provided at a right-angle protrusion formed by each of the second annular surfaces 12 and a next first annular surface 11.

Due to the spiral chip removal groove 14, chips cut off from the workpiece can be discharged along the spiral chip removal groove 14 when the spiral step twist drill bit drills a round hole in the workpiece. Thus, the drilling frees from stopping several times to clean the chips from the round hole of the workpiece.

Specifically, the spiral chip removal groove 14 is partially shown in FIG. 3. The connection between each of the first annular surface 11 and a corresponding second annular surface 12 is provided with a spiral chip removal groove 14, such that the chips cut off from the workpiece can be discharged to outside along the spiral chip removal groove 14.

Described above are merely illustrative of the disclosure, and are not intended to limit the disclosure. It should be understood that any changes, replacements and modifications made by those skilled in the art based on the content disclosed herein without departing from the scope of the disclosure shall fall within the scope of the present disclosure defined by the appended claims.

What is claimed is:

1. A spiral step twist drill bit, comprising:
   a shank; and
   a cutting portion;
   wherein the cutting portion is provided with a spiral flute and a body clearance; a tip of the cutting portion is provided with a chisel edge and a cutting edge; a flank face connected to the cutting edge is provided with a spiral cutting groove; a spiral direction of the spiral cutting groove is the same as a spiral direction of the spiral flute; a slope of the spiral cutting groove is the same as a slope of the flank face;

the spiral cutting groove is configured to divide the cutting edge into a plurality of segments to form a plurality of first edges and a plurality of second edges; the spiral cutting groove is configured to divide the flank face into a plurality of first annular surfaces and a plurality of second annular surfaces, wherein the plurality of first annular surfaces are perpendicular to the plurality of second annular surfaces; the plurality of first edges are respectively located on the plurality of first annular surfaces; and the plurality of second edges are respectively located on the plurality of second annular surfaces;

wherein a spiral chip removal groove is provided in a right-angle recess formed by each of the first annular surface and a corresponding second annular surface; and a spiral direction of the spiral chip removal groove is the same as the spiral direction of the spiral flute.

2. The spiral step twist drill bit of claim 1, wherein the spiral cutting groove has a varying pitch.

3. The spiral step twist drill bit of claim 1, wherein a pitch of the spiral cutting groove increases from the tip of the cutting portion towards the shank.

4. The spiral step twist drill bit of claim 3, wherein an increment rate of the pitch of the spiral cutting groove is 1.2-1.5.

5. The spiral step twist drill bit of claim 1, wherein a spiral transition step is provided at an end of each of the plurality of first annular surfaces away from a corresponding second annular surface; and a spiral direction of the spiral transition step is the same as that of the spiral flute.

* * * * *